United States Patent [19]

Weisfield et al.

[11] Patent Number: 4,737,805

[45] Date of Patent: Apr. 12, 1988

[54] MULTIFUNCTION IONOGRAPHIC MARKING APPARATUS

[75] Inventors: Richard L. Weisfield, Menlo Park; Hsing C. Tuan, Palo Alto, both of Calif.

[73] Assignee: Xerox Corporation, Stamford, Conn.

[21] Appl. No.: 906,068

[22] Filed: Sep. 11, 1986

[51] Int. Cl.$^4$ ............................................. G01D 15/00
[52] U.S. Cl. ................................. 346/159; 346/139 C
[58] Field of Search .......... 346/154, 155, 159, 139 C; 250/206; 358/300; 101/DIG. 13; 400/119

[56] References Cited

U.S. PATENT DOCUMENTS

| | | | |
|---|---|---|---|
| 4,356,347 | 10/1982 | Wiener | 346/154 |
| 4,584,592 | 4/1986 | Tuan et al. | 346/159 |
| 4,646,163 | 2/1987 | Tuan et al. | 346/154 |

Primary Examiner—Arthur G. Evans
Attorney, Agent, or Firm—Serge Abend

[57] ABSTRACT

An ionographic marking apparatus capable of multi-function operation for use as an input printer, a document copier or a document scanner. The apparatus includes a writing head comprising thin film elements including ion modulating electrodes, data and address lines, and self-biasing amplification circuits including thin film transistors, resistors and photosensors integrally fabricated upon a large area substrate.

13 Claims, 5 Drawing Sheets

MULTIFUNCTION IONOGRAPHIC MARKING APPARATUS

FIELD OF THE INVENTION

This invention relates to a fluid jet assisted ion projection marking apparatus provided with driver circuitry to enable its use as an input printer, a document copier or a document scanner. The marking head array includes ion modulating electrodes, data and address lines, self-biasing amplification circuits including thin film transistors and photosensors, which may be based on the amorphous silicon (a-Si:H) thin film technology. The self-biasing amplification circuits allow high speed copying and scanning and make gray scale copying possible.

BACKGROUND OF THE INVENTION

A fluid jet assisted ion projection printer, of the type utilized herein, is disclosed in commonly assigned U.S. Pat. No. 4,463,363 issued on July 31, 1984 in the name of Robert W. Gundlach and Richard L. Bergen, entitled "Fluid Jet Assisted Ion Projection Printing". In that printer, an imaging charge is placed upon a moving receptor sheet, such as paper, by means of a linear array of closely spaced minute air "nozzles". The charge, comprising ions of a single polarity (preferably positive), is generated in an ionization chamber by a high voltage corona discharge and is then transported to and through the "nozzles" where it is electrically controlled, within each "nozzle" structure, by an electrical potential applied to modulating electrodes therein. Selective control of the modulating electrodes in the array will enable spots of charge and absence of charge to be deposited on the receptor sheet for subsequent development.

The modulating electrodes may be incorporated in an inexpensive and compact integrated marking head array which also includes multiplexed driver circuitry and thin film transistor switching elements. Data potentials are selectively imposed upon the modulating electrodes. Such an arrangement is disclosed in commonly assigned U.S. Pat. No. 4,584,592 issued on Apr. 22, 1986 in the names of Hsing C. Tuan and Malcolm J. Thompson, entitled "Marking Head for Fluid Jet Assisted Ion Projection Imaging Systems".

An alternative driving circuit for the integrated marking head array is disclosed in co-pending a patent application Ser. No. 861,472, filed May 9, 1986 in the names of Hsing C. Tuan and Malcolm J. Thompson, and entitled "Improved Writing Head". As described therein, a latching circuit, including a switching element electrically connects the marking electrodes directly to a source of reference potential.

A fluid jet assisted ion projection copier is disclosed in commonly assigned patent application Ser. No. 784,293, filed Oct. 7, 1985 in the names of Hsing C. Tuan and Malcolm J. Thompson, and entitled "Ion Projection Copier". The marking head array incorporates modulating electrodes and photosensors which may either directly drive the electrodes or indirectly drive the electrodes through an amplification circuit. Two types of thin film sensors are disclosed. One, a gap-type exhibits a photoconductive gain of about 5, but has a characteristically slow response time. The other, a sandwich type, has a photoconductive gain of unity, but has a very fast photocurrent response time. An amplification circuit, requiring at least three sources of reference potential (high, low and ground) is disclosed therein for enabling practical use of the low gain sandwich type photosensor.

From the foregoing it can be seen that both a printer and a copier configuration have been individually contemplated for this ion projection marking process. However, rather than providing the user with a different machine to perform each of these functions, we suggest a single machine having a multifunction marking head array incorporating, on a page-wide substrate, an image sensor array, a modulation electrode array, function switching electronics and data input-output electronics. All of the elements may be implemented monolithically on the substrate, preferably in thin film amorphous silicon and materials compatible with its processing.

In the PRINT mode of a multifunction machine, the operation would be as described in the aforesaid U.S. Pat. No. 4,584,592 and the image sensor array would not be operational. In the COPY mode, the image sensor array would generate a photo-induced current in response to light reflected from an illuminated document, and the photo-induced current would, in turn, drive the modulating electrodes to produce a copy of the document. In the SCAN mode, the image sensor array again would generate a photo-induced current in response to light reflected from an illuminated document, and the photo-induced current would be detected and amplified by data input-output electronics for either storage or transmission to a remote site.

The function switching electronics of the multifunction marking head array serves to set the machine's mode of operation. It may: (1) make operational either the image sensor array connections to the modulation electrode array and disable the data input-output electronics connections, for operating in the COPY mode; (2) make operational the image sensor array connections to the modulation electrode array and enable the data input-output electronics connections, for operating in the SCAN mode; or (3) disable the image sensor array connections to the modulation electrode array and enable the data input-output electronics connections, for operating in the PRINT mode.

It is the primary object of the present invention to provide a multifunction head array which will allow PRINT, COPY and SCAN functions to be selectively implemented and in which an amplification circuit on the array enables the COPY function to have a rapid, self biasing, linear response. It is a further object of this invention also to provide the amplification circuit for the SCAN function.

It is further object of a form of this invention to provide an amplification circuit on the array which will enable the COPY and SCAN functions to have a rapid, self-biasing, linear response.

SUMMARY OF THE INVENTION

The present invention may be carried out, in one form, by providing a multifunction fluid jet assisted ionographic marking apparatus for placing electrostatic charges upon a charge receptor surface in a PRINT and in a COPY mode of operation and for sending signals to an external circuit, in a SCAN mode of operation. The apparatus includes an integral marking head comprising a substrate upon which is formed a plurality of closely spaced modulation electrodes, each being switchable between a marking state, covering a range of controlled densities, and a non-marking state and each having associated therewith mode responsive information loading circuits also formed upon the substrate. A first information circuit transmits marking signals to the modulation electrode from an external source, when the marking head is in a PRINT mode, and a second information circuit transmits marking signals to the modulation electrode from a substrate supported signal generator, in the form of a photosensor, when the marking head is in a COPY mode. The second information circuit includes an amplification circuit. A third information circuit, also formed upon the substrate, transmits signals from the signal generator to an external receiver, when the marking head is in a SCAN mode. A first switch selectively connects the first information circuit to the modulation electrode when the PRINT mode is invoked and a second switch selectively connects the second information circuit to the modulation electrode when the COPY mode is invoked. Both switches are closed when the SCAN mode is invoked. All of the modulation electrodes and circuit elements, including bus lines, photosensors, switches and other elements on the marking head are integrally formed upon the substrate as thin film elements.

BRIEF DESCRIPTION OF DRAWINGS

Other objects and further features and advantages of this invention will be apparent from the following, more particular description considered together with the accompanying drawings; wherein.

DETAILED DESCRIPTION OF THE ILLUSTRATED EMBODIMENTS

Figure 1:
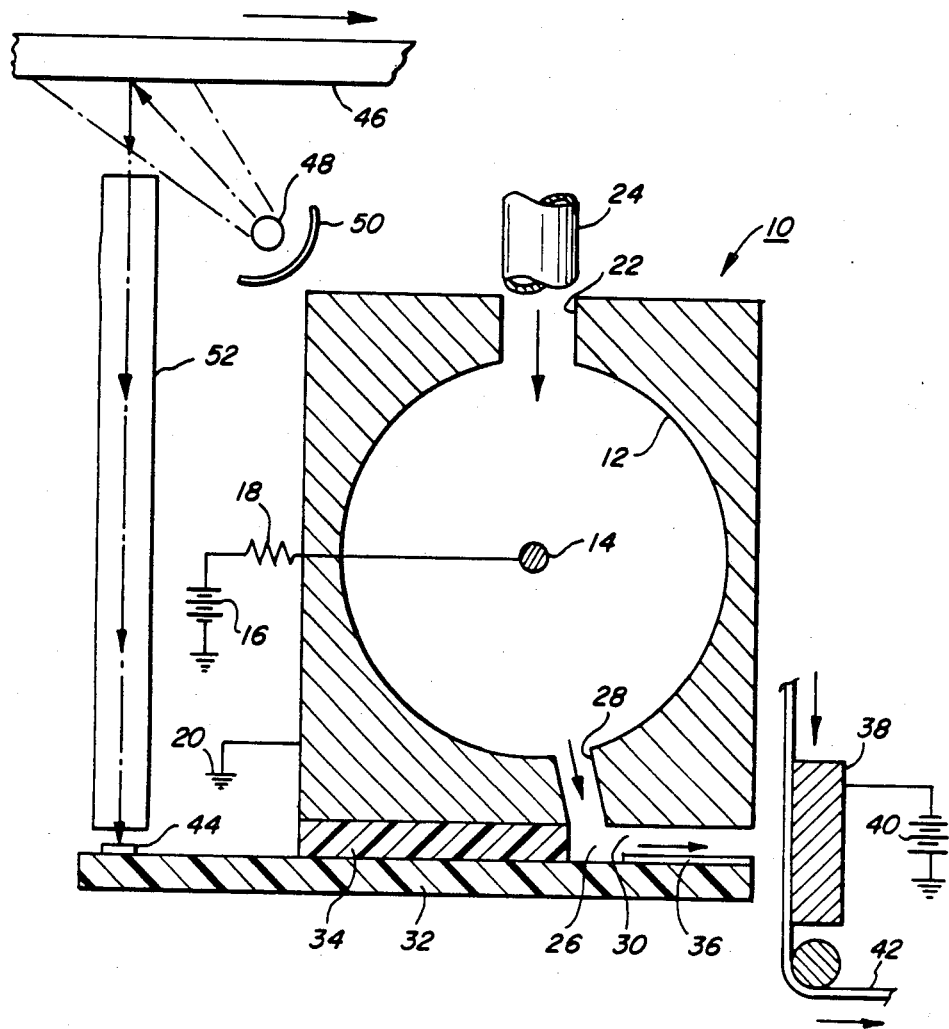
FIG. 1 is a schematic representation of a multifunction marking apparatus according to the present invention.

With particular reference to the drawings, there is illustrated in FIG. 1 a housing 10 similar to the fluid jet assisted ion projection printing apparatus of assignee's U.S. Pat. No. 4,524,371. The housing includes an electrically conductive, elongated chamber 12 and a corona discharge wire 14, extending along the length of the chamber. A high potential source 16, on the order of several thousand volts dc, is connected to the wire 14 through a suitable load resistor 18, and a reference potential source 20 (which may be ground) is connected to the wall of chamber 12. Upon application of the high potential to corona discharge wire 14, a corona discharge surrounds the wire, creating a source of ions of a given polarity (preferably positive), which fill the chamber with a space charge.

An inlet channel 22 extends along the chamber substantially parallel to wire 14, to deliver pressurized transport fluid (preferably air) into the chamber 12 from a suitable source, schematically illustrated by the tube 24. An outlet channel 26, from the chamber 12, also extends substantially parallel to wire 14, at a location opposed to inlet channel 22, for conducting the ion laden transport fluid to the exterior of the housing 10. The outlet channel 26 comprises two portions, a first portion 28 directed substantially radially outwardly from the chamber and a second portion 30 angularly disposed to the first portion. The second portion 30 is formed by the unsupported extension of a marking head 32 spaced from and secured to the housing by insulating shim 34. As the ion laden transport fluid passes through portion 30 of the outlet channel, it flows over an array of ion modulation electrodes 36, each extending in the direction of the fluid flow, and each integrally formed on the marking head 32. By selectively controlling the potential on modulation electrodes 36 the ion-laden fluid stream may be rendered intelligible.

As described in U.S. Pat. No. 4,463,363, once the ions in the transport fluid stream come under the influence of the modulation electrode, they may be viewed as individual "beams", which may be allowed to pass to the receptor sheet 42 or to be suppressed within the outlet channel 26. "Writing" of a single spot in a raster line is accomplished when the modulation electrode is selectively connected to a potential source at substantially the same potential as that on the opposing wall of the outlet channel. With both walls bridging the channel being at about the same electrical potential, there will be substantially no electrical field extending thereacross. Thus, ions passing therethrough will be unaffected and will exit the housing to be deposited upon the charge receptor. Conversely, when a suitable potential sufficiently different from that on the opposite wall is applied to the modulation electrode, a field will extend across the outlet channel. If the electrical potential imposed on the modulation electrode is of the same sign as the ions, the ion "beam" will be repelled from the modulation electrode to the opposite wall where the ions may recombine into uncharged, or neutral, air molecules. If the electrical potential imposed on the modulation electrode is of the opposite sign as the ions, the ion "beam" will be attracted to the modulation electrode where they also may recombine into uncharged, or neutral, air molecules. Therefore, that "beam" of transport fluid, exiting from the housing in the vicinity of that modulation electrode, will carry substantially no "writing" ions. Voltages of intermediate magnitude, imposed on the modulation electrode, will cause the ion current to be proportional thereto, allowing gray scale writing upon the charge receptor.

Ions allowed to pass through and out of the housing 10, through the outlet channel 26, come under the influence of accelerating back electrode 38 which is connected to a high potential source 40, on the order of several thousand volts dc, of a sign opposite to that of the corona source 16. An insulating charge receptor 42, such as paper, is interposed between the accelerating back electrode 38 and the housing 10, and is moved over the back electrode for collecting the ions upon its surface in a image configuration. Subsequently the latent image charge pattern may be made visible by suitable development apparatus (not shown). Alternatively, a transfer system may be employed, wherein the imagewise charge pattern is deposited upon an insulating intermediate surface such as a dielectric drum or belt, the charge pattern is made visible by development upon the dielectric surface, and then the developed image is transferred to a final image receptor sheet.

In order to duplicate an original document 46 upon the charge receptor 42, the COPY mode is invoked and the original document is illuminated by a suitable light source 48. A reflector 50 concentrates the optical energy upon the original, with some of the reflected optical energy falling within the collection angle of lens system 52. The light reflected from the original document passes through the lens system, projecting patterns of light and dark areas from the original document 46 onto the array of photosensors 44. Preferably, the lens system is in the form of a short optical length elongated lens strip of the Selfoc or graded index focusing type. An imagewise pattern of information will be formed by selectively controlling each of the modulation electrodes in the array in accordance with the intensity of light falling on the photosensors, so that the ion "beams" associated therewith either exit or are inhibited from exiting the housing in accordance with the pattern and intensity of light and dark spots on the original to be copied. A range of intensity states of controlled optical density is thus made possible in the COPY mode. It should be understood that a similar range of intensity states is possible in the PRINT mode by varying the data voltages.

The PRINT mode is fully described in U.S. Pat. No. 4,584,592 and U.S. Ser. No. 861,472, each of which is fully incorporated by reference herein.

Figure 2:
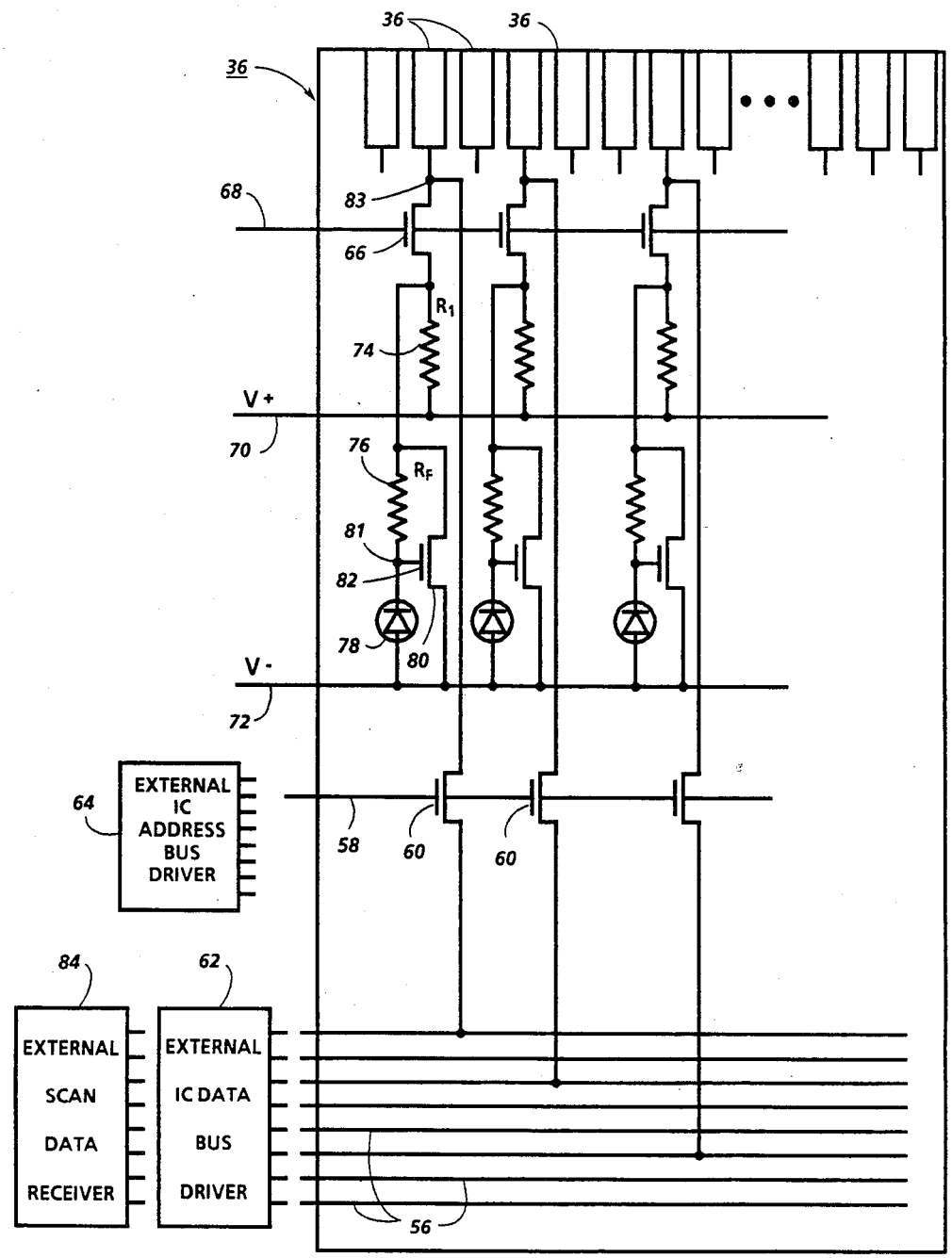
FIG. 2 is a schematic representation of one form of the marking head array of the present invention showing several modulation electrodes and their associated control circuits.

The multifunction marking head 32, shown schematically, in one form, in FIG. 2, comprises thin film elements supported upon a planar substrate 54. These elements include an array of modulation electrodes 36 extending along one edge of the substrate. A number of data lines 56 and a number of address lines 58 (one shown) controlling thin film switching elements 60, represent the data entry or information loading circuit of the PRINT mode, in which marking is accomplished by the direct application of data voltages sent from external IC data bus drivers 62. The address lines 58 receive signals from external IC address bus drivers 64.

The information loading circuit for the COPY mode includes an array of copy enable thin film switches 66, all of which are simultaneously driven by an externally controlled copy enable bus line 68. A high voltage (V+) bus line 70 and a low voltage (V−) bus line 72 are also provided across the substrate 54. Self-biasing photosensor amplification circuits each include a load resistor ($R_L$) 74, a feedback resistor ($R_F$) 76 and a photosensor 78, connected in series between buses 70 and 72, and a thin film transistor 80 connected in parallel with the feedback resistor 76 and photosensor 78. The potential ($V_G$) at node 81, between the feedback resistor and the photosensor, is imposed on the gate 82 of the transistor 80.

In the COPY mode of operation, the address line transistors 60 are in their OFF state to disconnect the information loading circuit of the PRINT mode and the copy enable transistors 66 are in their ON state to connect the information loading circuit of the COPY mode. The condition of each photosensor will control the ion flow past each respective modulation electrode 36. The reflected illumination from white areas of the original document 46 onto the photosensor 78 will generate sufficient photocurrent through it to cause $V_G$, at node 81, to drop in voltage thereby greatly decreasing current flow through the transistor 80. $V_{OUT}$, at node 83, will then go HIGH because less current is flowing through $R_L$, with the limit being $V_{OUT}=V+$ when the transistor is completely OFF. $V_{OUT}$ will be imposed on the modulating electrode 36 to inhibit ions flowing through channel 26 to the image receptor.

Conversely, the absence of reflected illumination, from dark areas of the original 46, usually will not generate enough photocurrent, through the photosensor, to cause current passage through $R_F$. However, since the node 81 had been LOW and the node 83 is made HIGH there will be an initial transient potential drop across $R_F$ and sufficient current will flow through it to charge gate 82. As the gate potential starts to rise, the transistor 80 will begin to turn ON and current flows through the transistor 80 and $R_L$, causing $V_{OUT}$ to start dropping. Continued transient current drop across $R_F$ will increase $V_G$, causing more current flow through the transistor and further decrease of $V_{OUT}$. At some point, a steady state equilibrium condition is achieved where there is no potential drop across $R_F$, no further current flows therethrough, and the circuit will settle to a steady state condition. Then the current flowing through $R_L$ matches the current flowing through the transistor and $V_{OUT}$ would equal $V_G$. This is the level at which the circuit will self-bias, since if the gate voltage should rise higher than this equilibrium value, the transistor will turn ON even more, $V_{OUT}$ will drop below that of the gate voltage, and a negative potential drop exists across $R_F$ causing charge to flow from the gate, reducing the gate voltage and current flow through the transistor, and raising $V_{OUT}$. This is the self-biasing phenomenon.

In the SCAN mode, both the copy enable switch 66 and the address switch 60 are turned ON so that charge stored at node 83 may be transmitted to an external receiver 84 via the data lines 56. Therefore, the output of the amplification circuit is available not only to drive the COPY mode modulation electrodes, but is also available in the SCAN mode. This arrangement minimizes the need for external amplification in the SCAN signal receiver.

Figure 3:
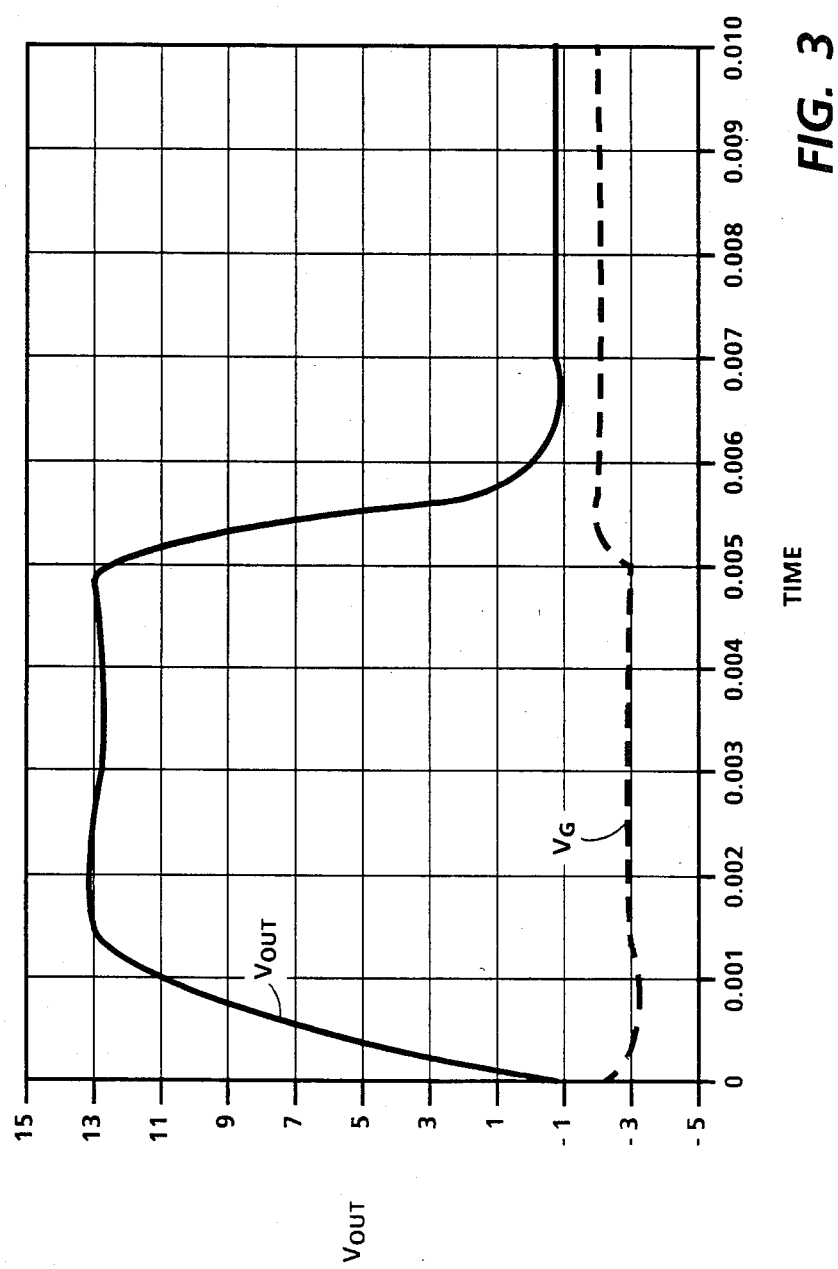
FIG. 3 is a graphical representation of the output of the self-biasing amplification circuit responding to a light pulse.

FIG. 3 illustrates a computer generated graphical representation of the self-biased amplification circuit as it responds to the light and dark areas of the original document. First, in the light areas, $V_G$ decreases slightly and $V_{OUT}$ rises rapidly. This illustrates the transistor gain. There is shown a slight overshooting of $V_{OUT}$ before restoration of the steady state condition. Then, in the dark areas, $V_G$ increases and $V_{OUT}$ drops and again overshoots slightly before restoration of the steady state condition. It will be noted that the steady state value of $V_{OUT}$ in the dark areas is greater than $V_G$. This is because no absolute absense of light condition exists. Even black areas of a document reflect some light. Therefore, in the computer model, black areas were assumed to reflect about 10% that of white areas.

Exemplary parametric values of the amplification circuit are as follows: $V+=20$ volts; $V-=-5$ volts; $R_L=2\times10^8$ ohms; $R_F=4\times10^9$ ohms; and the sensors yield about 4 nanoamperes of photocurrent ($I_{PH}$) when fully illuminated. Under these conditions, the amplification circuit self-biases so that $V_{OUT}$ is about 3 to 4 volts above V−. Therefore, V− has been selected so that $V_{OUT}$, in the dark, will be about 0 volts.

The following equation represents the steady state illumination condition:

$$V_{OUT}=V_G+(I_{PH})(R_F)$$

Due to the approximately ten-fold gain of transistor 80, a small change in $V_G$ causes a substantially greater change in $V_{OUT}$. Thus, since $V_G$ does not change very much, $V_{OUT}$ will respond generally linearly with respect to the photosensor current which, in turn, is "linearly" responsive to the amount of illumination falling on the sensor. The "linearity" will have about a 10% deviation.

Figure 4:
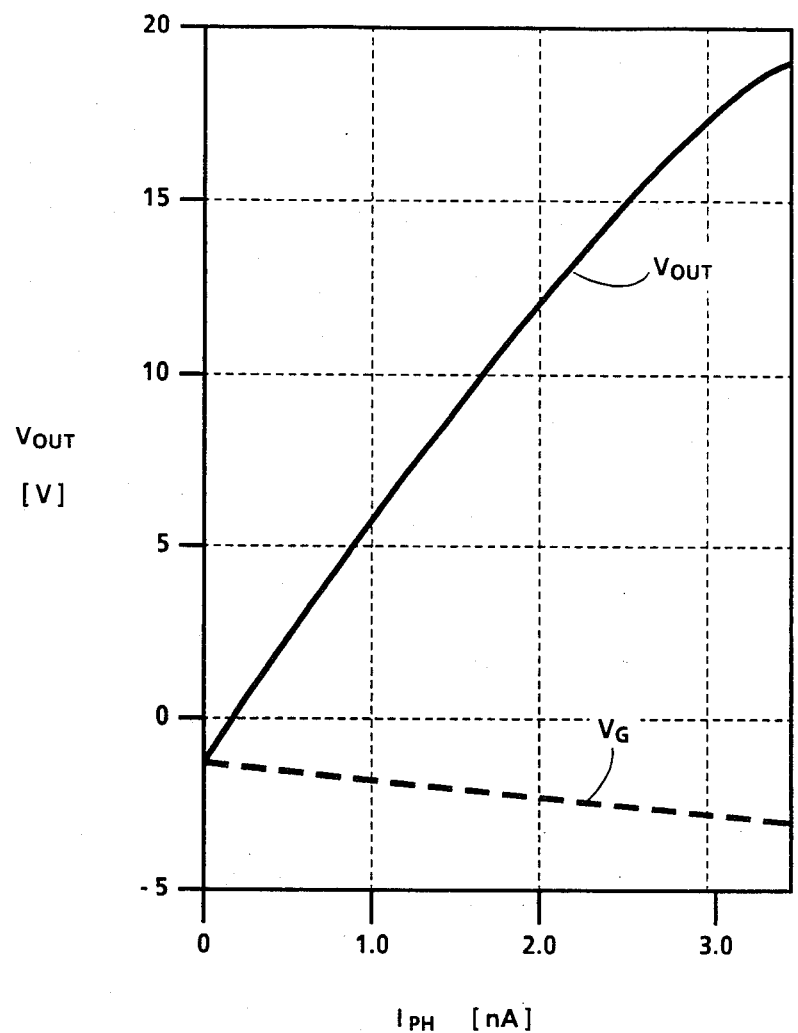
FIG. 4 is a graphical representation of the linear output response of the self biased amplification circuit utilized in the marking head array.

FIG. 4 illustrates the amplification feature of this invention and the linearity of output voltage which enhances grey scale copying. A 2 volt variation in the gate voltage causes about a 20 volt variation in output voltage. The gate voltage is controlled by the photosensor current in response to the amount of illumination reflected from the original document. "White" background areas can be seen to yield the maximum photocurrent of about 3.5 nA, while "black" information areas will reflect roughly 10% of the light and can be seen to yield about 0.3 nA.

The output may be made more linear, and simultaneously faster, by increasing the amplifier gain. In order to achieve these benefits, it is contemplated to gang a number of amplification transistors in a cascade arrangement with the output of one transistor connected to the gate of the transistor of the next stage. Thus, a gain of 100 is easily achieved by adding one more stage so that each 1 volt change in $V_G$ of the first stage transistor will cause a 100 volt change in $V_{OUT}$ of the second stage transistor. When higher resolution is desired, a greater number of smaller photosensors will be required. Each of these will generate less photocurrent for the same illumination intensity. Ganging would enable a 0.1 volt gate voltage to generate a 10 volt output and thereby enable the same speed as now obtained, with higher spot density.

The photosensor of choice is a Schottky diode sandwich including a thin amorphous silicon layer between an indium tin oxide (ITO) blocking contact and a chromium blocking contact. A necessary characteristic for obtaining scan line uniformity is predictability. With a quantum efficiency of unity, the Schottky sensor will be highly predictable since the amount of current to be obtained from a given amount of illumination will be proportional to its area. In the sizes contemplated herein, the device of this type generates sufficient photocurrent to be practical, but its unity quantum efficiency results in low photocurrent output, i.e., in the 1 to 5 nanoampere range, down about a factor of ten from being able to directly drive the modulation electrodes. Therefore, this type of photosensor necessitates an amplification circuit. Other unity gain photosensors may also be used.

Another advantage of these Schottky diode photosensors is that they exhibit a very fast response time, being limited by the transit time of the carriers through the thickness of the thin amorphous silicon layer. For a document being copied at the speed of 2 inches per second and having a resolution of 300 pixels per inch, one pixel will be scanned in 1.6 milliseconds. To be on the safe side, a sensor used under these conditions should be fast enough to generate full current in a maximum of 1 millisecond. The Schottky diode photosensors contemplated for use will ordinarily respond in about 1 microsecond, clearly fast enough for the present application. In this case, the response time of the self-biased amplification circuit is limited by the circuit itself and not by the photosensor.

As a general rule, photocurrent is area dependent. Given a linear array having 300 pixels per inch, the maximum real estate allowed for each photosensor is 85 $\mu m \times 85$ $\mu m$. Within this area, each photosensor comprises an amorphous silicon layer usually in the range from about $\frac{1}{2}$ $\mu m$ to 2 $\mu m$, preferably, about 1 $\mu m$ thick, and sandwiching layers typically 700 to 800 Angstroms of ITO and about 1000 Angstroms of chromium. The thickness of the amorphous silicon layer is not significant, but a thicker layer will enhance performance somewhat by allowing collection of the very weakly absorbed red end of the spectrum. The thickness of the ITO layer is chosen to produce an antireflection coating for coupling more light into the sensor at a wave length of about 6000 Angstroms.

Figure 5:
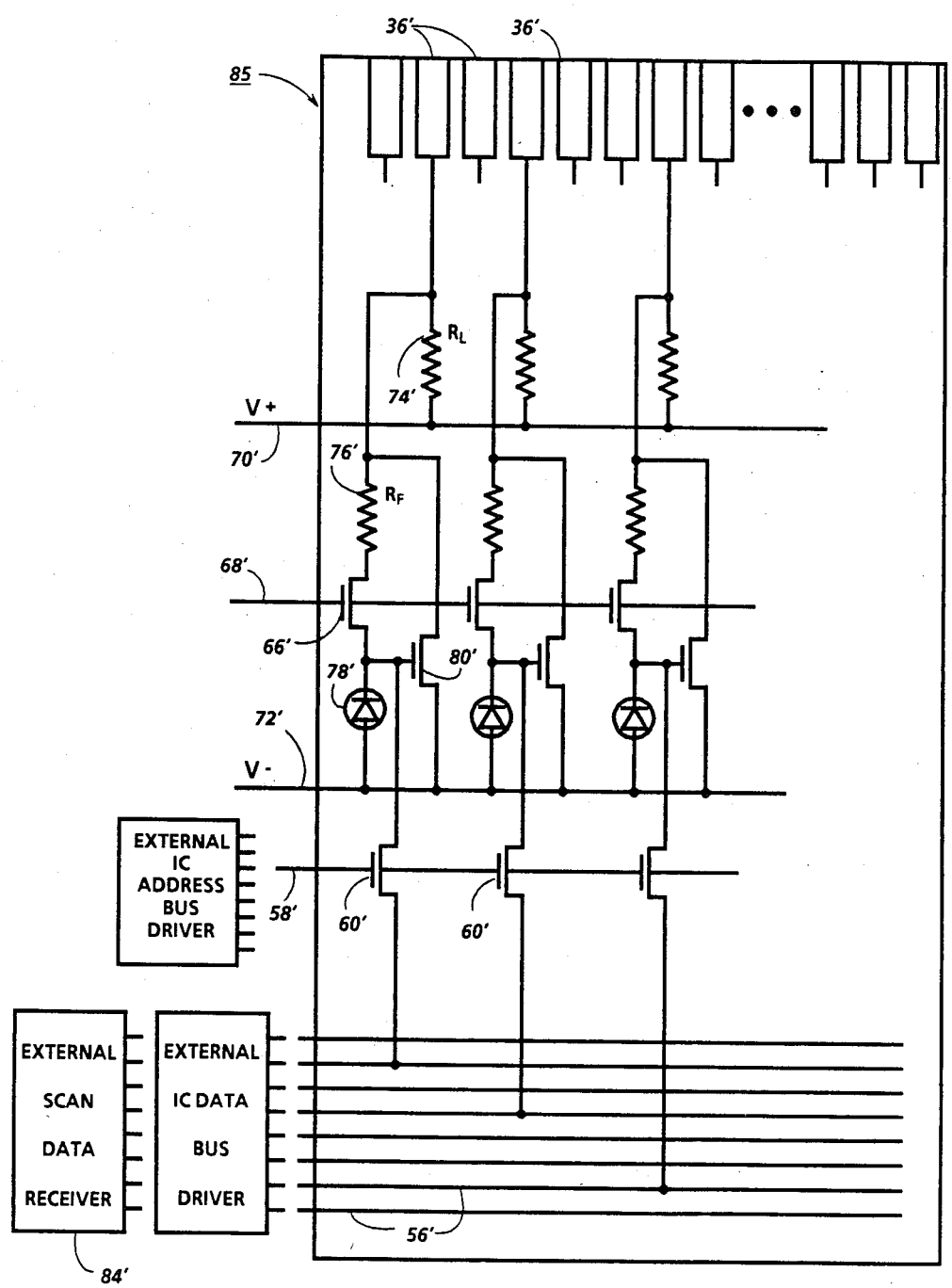
FIG. 5 is a schematic representation of another form of the marking head array of the present invention.

An alternative arrangement of the circuit elements of the multifunction marking head is illustrated in FIG. 5. The marking head is identified as 85 and similar elements are identified with the same number as in the FIG. 2 embodiment, with a prime (') attached. Each modulation electrode 36' has associated therewith circuitry for enabling the marking head to be used selectively in a PRINT, COPY or SCAN mode. This embodiment is based on the inverter circuit printer head embodiment of FIG. 4 of copending patent application Ser. No. 861,472, referenced above.

The PRINT mode information loading circuit is of the inverter type. It includes, for each modulation electrode, a high voltage (on the order of 20 volts) bus line 70' (V+), resistors 74' and 76', a copy enable thin film switch 66', a thin film address switch 60' controlled by address bus 58', and data line 56'. During the PRINT mode, the address switch 60' is ON and the copy enable switch 66' is OFF. This arrangement allows low voltage data signals to be used, as fully described in the co-pending application.

In the COPY mode, the address switch 60' is OFF and the copy enable switch 66' is ON. The COPY mode information loading circuit comprises a self-biasing amplification circuit which includes the high voltage bus line 70' (V+), a low voltage bus line 72' (V−), load resistor 74' ($R_L$), feedback resistor 76' ($R_F$), photosensor 78', and thin film transistor 80'. It is identical in configuration and operation to the FIG. 2 circuit.

In the SCAN mode, the address switch 60' is ON and the copy enable switch 66' is OFF. The photosensor signal will pass directly to the data line 56' for transmittal to an external receiver 84'. It should be noted that there will be no amplification of the photosensor signal, as there is in the FIG. 2 configuration, because the output of the photosensor is connected directly to the data line. The very low level output voltages generated by the photosensor will require subsequent amplification.

It should be understood that the present disclosure has been made only by way of example, and that numerous changes in details of construction and the combination and arrangement of parts may be resorted to without departing from the true spirit and scope of the invention as hereinafter claimed.

What is claimed:

1. An integral marking head for a multifunction ionographic marking apparatus, said marking head comprising a substrate upon which is formed a plurality of closely spaced ion transport modulation electrodes, each being switchable between a marking state and a non-marking state and each having associated therewith:
    a first information circuit for transmitting marking signals to said modulation electrodes from an external source, when said marking head is in a PRINT mode, a second information circuit for transmitting marking signals to said modulation electrodes from a substrate supported signal generator in the form of an array of photosensors, when said marking head is in a COPY mode, said second information circuit comprising an array of signal amplification circuits, each amplification circuit including the output of one of said photosensors, a third information circuit for transmitting signals from said substrate supported signal generator to an external receiver, when said marking head is in a SCAN mode, and wherein each of said modulation electrodes and said first, second and third information circuits are integrally formed upon said substrate as thin film elements.

2. The integral marking head for a multifunction ionographic marking apparatus as defined in claim 1 wherein said first information circuit includes first means for selectively connecting said external source to said modulation electrode and said second information circuit includes second means for selectively connecting the amplified output of said signal generator to said modulation electrode so that, in said PRINT mode said first means is closed and said second means is open, in said COPY mode said first means is open and said second means is closed, and in said SCAN mode both said first means and said second means are closed.

3. The integral marking head for a multifunction ionographic marking apparatus as defined in claim 1 wherein said first information circuit includes first means for selectively connecting said external source to said modulation electrode and said second information circuit includes second means for selectively connecting the amplified output of said signal generator to said modulation electrode so that, in said PRINT mode said first means is closed and said second means is open, in said COPY mode said first means is open and said second means is closed, and in said SCAN mode said first means is closed and said second means is open.

4. The integral marking head for a multifunction ionographic marking apparatus as defined in claim 1 wherein said amplification circuits are selfbiasing.

5. The integral marking head for a multifuntion ionographic marking apparatus as defined in claim 1 wherein each of said amplification circuits includes a thin film transistor having a gate, to which the output of said photosensors are connected.

6. The integral marking head for a multifunction ionographic marking apparatus as defined in claim 1 wherein each of said photosensors is a unity gain device.

7. The integral marking head for a multifunction ionographic marking apparatus as defined in claim 6 wherein said photosensor comprises a Schottky diode.

8. The integral marking head for a multifunction ionographic marking apparatus as defined in claim 7 wherein said photosensor includes an amorphous silicon layer sandwiched between two electrically conductive blocking contacts.

9. The integral marking head for a multifunction ionographic marking apparatus as defined in claim 1 wherein a high voltage bus line and a low voltage bus line are provided on said substrate and each of said self-biasing amplification circuits comprises a load resistor, a feedback resistor and one of said photosensors connected in series between said bus lines and one of said thin film transistors is connected in parallel with said feedback resistor and said photosensor.

10. The integral marking head for a multifunction ionographic marking apparatus as defined in claim 1 wherein said marking signals transmitted by said second information circuit are proportional to the intensity of illumination falling upon said array of photosensors.

11. The integral marking head for a multifunction ionographic marking apparatus as defined in claim 1 wherein said signals transmitted by said third information circuit to said external receiver are proportional to the intensity of illumination falling upon said array of photosensors.

12. The integral marking head for a multifunction ionographic marking apparatus as defined in claim 10 wherein said signals transmitted by said third information circuit to said external receiver are proportional to the intensity of illumination falling upon said array of photosensors.

13. The integral marking head for a multifunction ionographic marking apparatus as defined in claims 1, 11 or 12 wherein said signals transmitted by said third information circuit to said external receiver are amplified by said second information circuit.

* * * * *